UNITED STATES PATENT OFFICE.

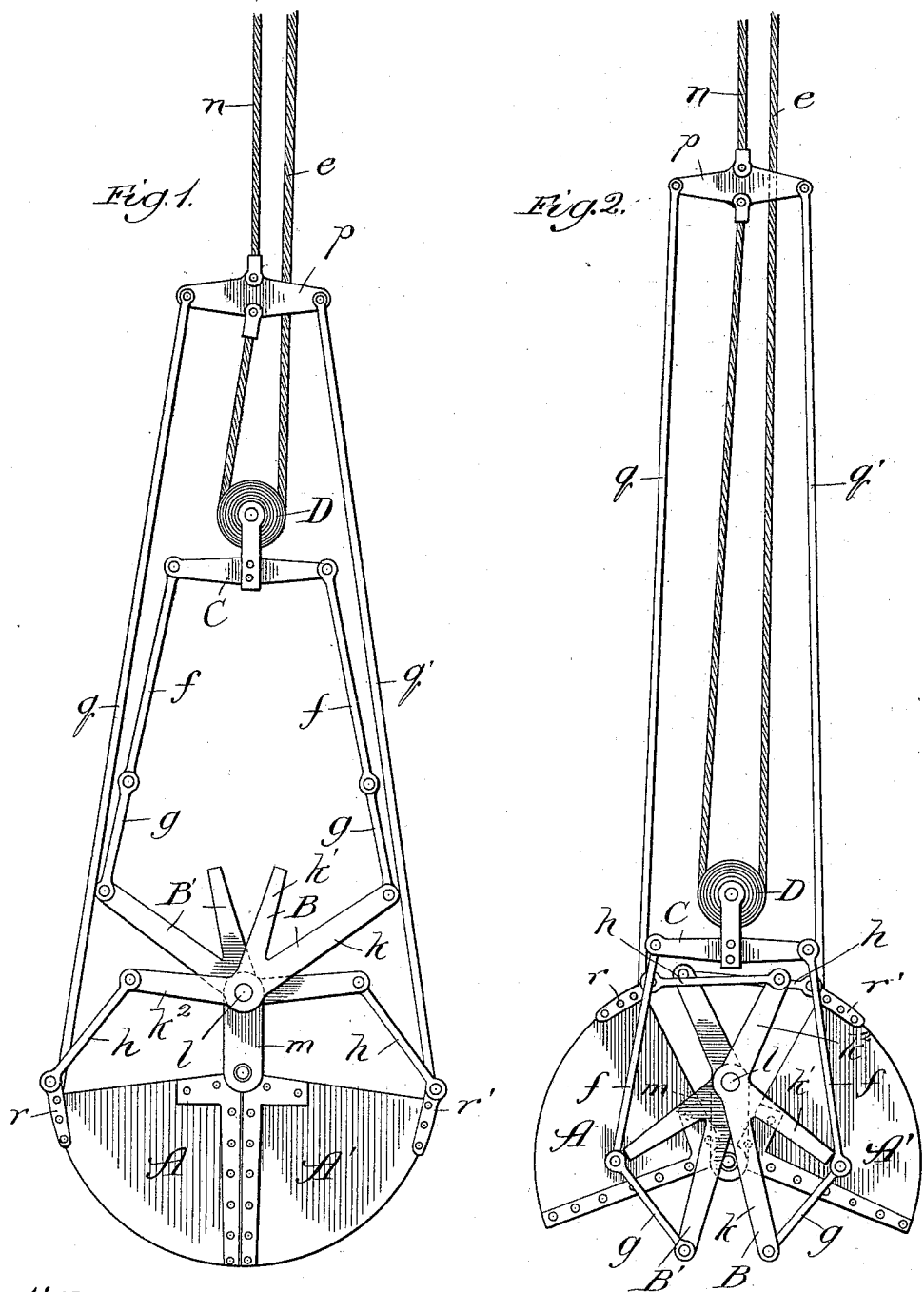

JOSEPH KIESLER, OF CHICAGO, ILLINOIS.

POWER-SHOVEL.

SPECIFICATION forming part of Letters Patent No. 624,659, dated May 9, 1899.

Application filed March 8, 1897. Renewed October 17, 1898. Serial No. 693,813. (No model.)

*To all whom it may concern:*

Be it known that I, JOSEPH KIESLER, a citizen of the United States, residing at Chicago, in the county of Cook and State of Illinois, have invented a new and useful Improvement in Power-Shovels, of which the following is a specification.

My invention is in the nature of an improvement on the power-shovel for which Letters Patent of the United States No. 563,492 were granted to me on the 7th day of July, 1896.

The object of my improvement is to provide a construction whereby the hinged scoop-jaws are caused more effectively to dig into the material to be shoveled without to that end increasing the weight of the shovel.

As the only departure from the construction described in the above-named patent is in the manner of connecting the hoisting and dumping chains to the shovel, the latter is herein described only sufficiently to clearly render its operation comprehensible.

In the accompanying drawings, Figure 1 is a view in end elevation of a power-shovel involving my improvements, showing the hinged scoop-jaws closed; and Fig. 2, a similar view with the jaws opened.

A A' are the scoop-jaws, preferably sections of a cylinder with closed ends, pivoted together along the axis of the cylinder and provided at their outer upper corners with ears $r$ $r'$, to which are pivoted links $q$ $q'$. The links $q$ $q'$ in turn are pivoted to the opposite ends of cross-bars $p$, to which are attached the dump-cables $n$, connected with a common dump-cable. (Not shown.)

Projecting upward from the hinges of the jaws at their opposite ends are arms $m$, carrying a shaft $l$, upon which are fulcrumed bell-crank levers B B', each having, besides the lever-arms $k$ $k^2$, a branch arm $k'$. The arms $k^2$ are pivotally connected to links $h$ $h$, which in turn are pivoted to the ears $r$ $r'$. The arms $k$ are pivotally connected to links $g$ $g$, which are connected by means of chains or pivoted links $f$ to the ends of lifting-beams C. The lifting-beams are provided with pulleys D, through which pass lifting-cables $e$, connecting at one end with the cross-bars $p$ and at the other to a common lifting-cable. (Not shown.)

The operation is as follows: The shovel, supported by the dump-cables $n$, is lowered till it rests with the jaws open, as shown in Fig. 2, upon the material to be shoveled. The cables $n$ are then slacked, and simultaneously therewith the lifting-cables $e$ are drawn taut. It will be seen that the effect of the upward lift on the lifting-beams C is to rotate the arms $k^2$ of the bell-crank levers downward, thus forcing the jaws shut, the first lifting force being rendered more effective by the branch arms $k'$, and that this shutting force is supplemented by the downward pull of the lifting-cables upon the cross-bars $p$ transmitted to the outer upper corners of the jaws through the links $q$ $q'$. Thus the closing force is greatly augmented and the device rendered much more effective in handling hard or lumpy material. Furthermore, in any case, whether the material be such as to resist closing or not, the pulleys D act as movable pulleys until the jaws are closed, thus lessening the strain necessary upon the lifting-cable.

What I claim as new, and desire to secure by Letters Patent, is—

1. In a power-shovel, the combination of two hinged scoop-jaws, a hoisting-pulley, bell-crank levers fulcrumed upon a bearing supported by said jaws, and linked at one lever-arm to one of said jaws and connected at the other lever-arm to said pulley, a dump-cable, links pivotally connected with the scoop-jaws and the dump-cable, and a lifting-cable connected at one end with said dump-cable, and passing thence about said pulley, substantially as and for the purpose set forth.

2. In a power-shovel, the combination of two hinged scoop-jaws, a lifting-beam, a pulley attached thereto, bell-crank levers fulcrumed upon a bearing supported by said jaws and linked at one lever-arm to one of said jaws and at the other lever-arm to said lifting-beam, a dump-chain cross-bar, links pivotally connected therewith and with the scoop-jaws, and a lifting-cable connected at one end with said dump-chain cross-bar, and passing thence about said pulley, all arranged substantially as described and for the purpose stated.

JOSEPH KIESLER.

In presence of—
 J. H. LEE,
 R. T. SPENCER.